Patented May 15, 1934

1,958,707

UNITED STATES PATENT OFFICE 1,958,707

PROTECTIVE COVERING INCLUDING TRICRESYL PHOSPHATE

Neil S. Kocher, Rochester, N. Y., assignor to Eastman Kodak Company, Rochester, N. Y., a corporation of New York No Drawing. Application September 9, 1930, Serial No. 480,805

1 Claim. (Cl. 91—68)

This invention relates to lacquers and more particularly relates to a protective covering comprising a basic coating of cellulose ester lacquer, varnish or paint and particularly of cellulose nitrate lacquer, an intermediate coating containing a cellulose derivative and an overcoating containing an organic derivative of cellulose, such as cellulose acetate.

In my application, Serial No. 444,874, I have described broadly the use of a basic coating, usually containing a pigment, an intermediate coating preferably consisting of a clear cellulose nitrate layer and an overcoating of cellulose acetate, it being there stated that suitable plasticizers may be incorporated in the cellulose acetate lacquer overcoating.

In my applications, Serial Nos. 475,505-6, I have described certain plasticizing light filters which may be incorporated in the cellulose acetate lacquer overcoating, such, for instance, as phenyl benzoate, benzyl acetate, benzyl benzoate, and others. Also in my application, Serial No. 475,507, I have described that certain plasticizers may be employed in the cellulose acetate overcoating and that with these plasticizers certain light filters may also be employed.

I have now discovered that certain other compounds may be quite usefully employed in the cellulose acetate overcoating (over the clear nitrate intermediate layer) as a plasticizer. With this plasticizer, there may, of course, be employed filters as described in my application, Serial No. 457,507. I have found, for instance, that tri-cresyl phosphate may be quite usefully employed as a plasticizer in the cellulose acetate overcoating. This compound does not have the property of filtering out or absorbing ultra violet light, but it does have the novel property of giving to the cellulose acetate overcoating the property of close adherence to the cellulose nitrate intermediate layer and the further property of withstanding weathering conditions quite successfully, so that the cellulose acetate overcoating does not deteriorate, bloom, blister, or otherwise become useless.

It will be understood that I have no intention of applying directly to the usual cellulose nitrate lacquer basic coating, an overcoating containing these plasticizers for the reason that I have found that the cellulose acetate overcoating containing these plasticizers withstands deterioration much more successfully if there is interposed between the cellulose nitrate lacquer basic coating and cellulose acetate overcoating, an intermediate layer of clear cellulose nitrate as described in my application, Serial No. 444,874.

In utilizing this novel plasticizer, I would, therefore, first apply to the article to be protected, such as a wooden or metal surface, a coating of the ordinary cellulose nitrate or pyroxylin lacquer now obtainable on the market. Over this basic coating, I would then apply a clear cellulose nitrate solution, such as a solution of 20 ozs. of one-half second cellulose nitrate cotton dissolved to one gallon in a solvent composed of approximately 50% butyl acetate and 50% toluol. Over this clear cellulose nitrate intermediate coating, I may then apply a cellulose acetate lacquer overcoating comprising approximately 20 ozs. of cellulose acetate of low viscosity, 0 to 20 ozs. of resin, and from 8 to 12 ozs. of tri-cresyl phosphate, all dissolved in one gallon of a solvent mixture composed of approximately 25% ethyl acetate, 30% acetone, 25% ethyl lactate and 20% ethyl alcohol. The resin employed may be Kauri, Congo, or Manilla gum which has been treated in powder form with 30% nitric acid at 80° C. for about 24 hours. Obviously, variations in formula as described in my application Serial No. 444,874 may be resorted to without departing from the spirit or scope of this invention.

What I claim as my invention and desire to be secured by Letters Patent of the United States is as follows:

An article of manufacture having a protective covering comprising a basic coating of pyroxylin lacquer, an overcoating containing cellulose acetate and tri-cresyl phosphate and an intermediate coating consisting essentially of cellulose nitrate and compatible with and bonding firmly together the basic coating and the overcoating.

NEIL S. KOCHER.